Figure 1:
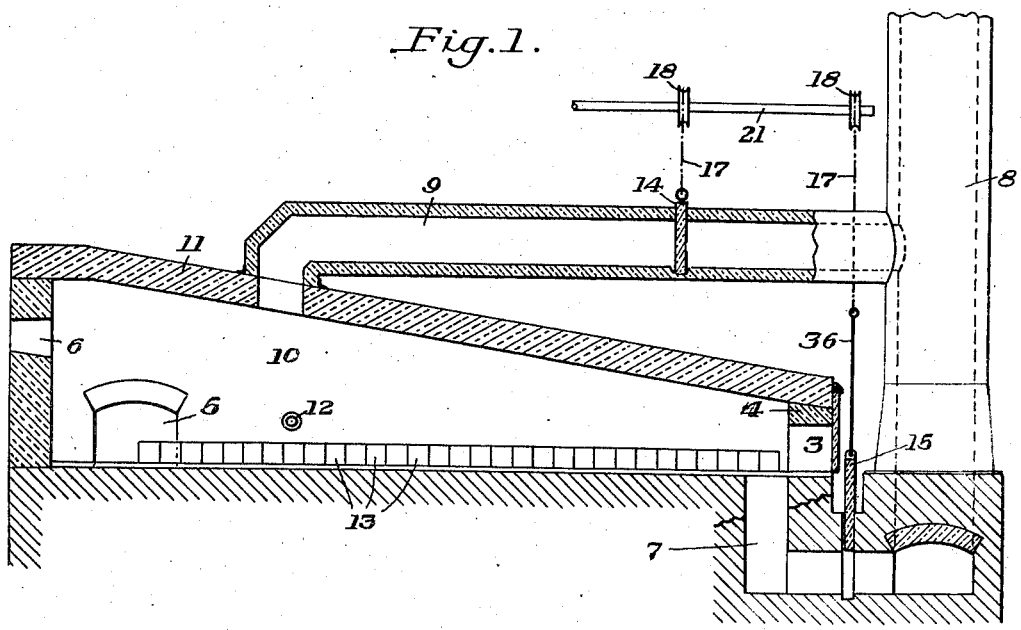

Oct. 31, 1939.                M. H. MAWHINNEY                2,177,733
                               METHOD OF HEATING
                              Filed Jan. 21, 1937

INVENTOR
Mathew H. Mawhinney,
by his attys.
Stebbins, Blenko + Parmelee

Patented Oct. 31, 1939

2,177,733

UNITED STATES PATENT OFFICE 2,177,733

METHOD OF HEATING

Matthew H. Mawhinney, Salem, Ohio

Application January 21, 1937, Serial No. 121,496

8 Claims. (Cl. 263—52)

This invention relates to a method of heating and has for its principal object the reduction of decarburization of steel while it is being heated in preparation for further processing, such as rolling. In addition, this invention tends to minimize the formation of scale on the steel.

The reduction of decarburization in heating is a problem of major importance for two reasons; first, the increasing use in the steel industry of high carbon and alloy steels; and second, the increasingly exact metallurgical processes and specifications. The two factors largely responsible for decarburization are the type of atmosphere in the heating furnace and the length of time during which the steel remains at a temperature sufficiently high to cause decarburization. In continuous furnaces which are used in connection with the rolling of rods, sheets, strip and the like, the atmosphere is readily controllabe, but it has heretofore been impossible to control with any sufficient degree of accuracy the time during which the steel remains at any particular temperature. As is well known, there is great variation in the rate of delivery of steel from the furnace, due to roll changes, mill delays and variation in the time required to roll different sizes of finished product. If the delivery of steel from the continuous furnace is delayed for any reason, the heat in the furnace works back towards the charging end of the furnace subjecting the steel to high temperatures for excessive periods of time. The surface layer of the steel is decarburized and must be removed by grinding. This grinding process is extremely expensive.

My invention prevents the exposure of the steel to high temperatures over a relatively long period of time by automatically changing the path of flow of heat through the furnace when the steel reaches a maximum temperature below that at which substantial decarburization takes place. This temperature will vary according to the composition of the steel, the type of burner used and the condition of the furnace atmosphere. To change the path of the flow of heat, I provide a by-passing flue leading from the heating chamber of the furnace to the furnace stack. When the steel reaches a temperature determined as set forth above, the by-pass automatically opens and the heat flows through the by-pass directly to the stack and does not work back towards the charging door of the furnace. When the temperature of the steel lowers, the by-pass is automatically closed and heat flows through the furnace over the steel and through the usual flue located at the charging end of the furnace leading to the stack. Therefore, if the rolling operations are delayed, the steel is not subjected to high temperature for a length of time sufficient to cause excessive decarburization.

Figure 2:
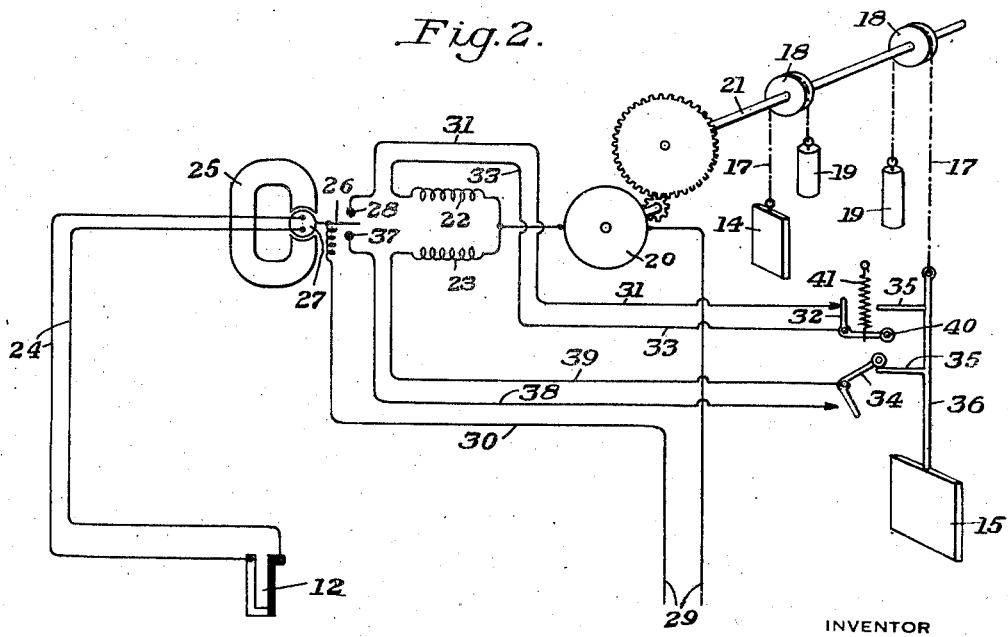

In the accompanying drawing I have illustrated a present preferred embodiment of my invention in which:

Figure 1 is a cross section of a continuous furnace constructed according to my invention; and Figure 2 is a schematic diagram showing a means for automatically opening and closing the by-passing flue.

In Figure 1 there is shown a continuous furnace. A charging door 3 is located in the end wall 4 and a discharging door 5 is located in a side of the furnace. The furnace is fired through burner ports 6 and in normal operation the heat flows through the furnace to the flue 7 connected to the stack 8. A by-passing flue 9 enters the heating chamber 10 through the roof 11 of the furnace, and connects the heating chamber directly with the stack 8. The by-passing flue 9 may enter the heating chamber at any desired point along the roof 11 but preferably it is at a distance from the charging end of the furnace equal to more than two-thirds the length of the furnace. A pyrometer 12 is so located in the heating chamber 10, that it is actuated by the temperature of the billets 13 which pass through the furnace. When the billets 13 passing the pyrometer 12 reach a certain predetermined temperature, the pyrometer actuates mechanism, later to be described, which raises the damper 14 in the by-passing flue 9 and lowers the damper 15 in the flue 7. Heated gases generated at the burner port 6 then flow through the by-passing flue 9 directly to the stack 8. When the temperature of the steel billets 13 drops below the predetermined temperature, the pyrometer again actuates mechanism, later to be described, which lowers the damper 14 and raises the damper 15. The hot gases then flow from the burner port 6 over the steel billets 13 and out to the stack 8 through the flue 7. If desired, the contour of the roof 11 may be varied to suit varying conditions of heating and rolling.

This by-passing of the hot gases will not affect those of the billets which lie between the point where the by-passing flue enters the heating chamber and the discharging door. However, these billets travel only a short distance before they are discharged and, therefore, they are heated to rolling temperature with sufficient rapidity to prevent decarburization and scaling.

If the stopping of the rolling mills can be anticipated, as when rolls are changed, the billets lying between the entrance of the by-passing flue and the discharge door will be discharged before the mills are stopped. If the mills are stopped unexpectedly, these billets may be discharged and later recharged into the furnace through the charging door. In the normal operation of the furnace, the steel is discharged for further processing at such a rate of production that decarburization takes place only to a very slight extent. Therefore, during normal operation the by-passing flue remains closed and the furnace operates in the same manner as the usual continuous furnace. It is the purpose of my invention to reproduce these conditions when production is slowed down or is stopped completely.

In Figure 2 there is shown a schematic diagram of the apparatus used in raising and lowering the dampers 14 and 15. The dampers 14 and 15 are raised or lowered by chains 17 wound over pulleys 18 and are counterweighted by weights 19. The pulleys 18 are turned by a reversible motor 20 geared to the shaft 21 on which pulleys are mounted. While any suitable reversible motor may be used, in this figure the motor 20 is shown as having oppositely wound field coils 22 and 23.

In Figure 2 the pyrometer 12 is indicated as a thermocouple, although other temperature sensitive instruments may be used. When the billets 13 reach a predetermined temperature for which the pyrometer 12 has been adjusted, the pyrometer sets up a current flowing through the wires 24 and actuates the magnetic selective relay 25, causing an arm 26 mounted on the armature 27 of the selective relay 25 to contact the electrical contact point 28. Electric current then flows from a source of power 29 through the wire 30, the arm 26, the wire 31, the limit switch 32, the wire 33, and through the field coil 22 of the motor 20. The motor 20 then turns the pulleys 18 so as to raise the damper 14 and lower the damper 15. To stop the motor 20 when the dampers 14 and 15 have been moved a sufficient distance to open and close the flues, limit switches 32 and 34 are included in the electrical circuit. These switches are operated by properly spaced projections 35 on the rigid rod 36 attached to the damper 15. When the temperature of the steel billets 13 reaches a point lower than that previously determined, the pyrometer 12 again actuates the magnetic selective relay 25 but in an opposite direction. The arm 26 then contacts the electrical contact 37 and current from the source of power 29 flows through the wire 30, the arm 26, the wire 38, the limit switch 34, which was closed when the damper 15 was lowered, through the wire 39, the field coil 23, the motor 20, and thence back to the source of power 29. Thus the damper 14 is lowered and the damper 15 is raised. When the damper 15 is raised, the projections 35 open the limit switch 34, thus stopping the motor 20 and releasing the crank arm 40 of the limit switch 32 so that the switch may be closed by the spring 41. With the closing of the limit switch 32 the circuit is ready to again open the by-passing flue 9 when the temperature of the steel billets 13 rises above the predetermined temperature.

Therefore it can be appreciated that by my invention, decarburization and scaling of steel while being heated in a continuous furnace is reduced and large savings are effected through the consequent substantial reduction in the amount of grinding. All the steel treated in the furnace is subjected to substantially constant heat conditions, although the rate of discharge of the steel from the furnace is highly variable. In addition my invention is automatic and operates independently of any automatic or manual fuel control which is required to maintain the proper rolling temperature of the steel at the discharging end of the furnace.

While I have shown only one present preferred embodiment of my invention, it is to be understood that it may be otherwise variously embodied and practiced within the scope of the following claims.

I claim:

1. The method of heating steel bodies which comprises subjecting a procession of such bodies to a flowing stream of heated gases, and shortening the time of exposure of the procession to the flowing stream by deflecting the flowing stream away from the procession upon the retarding of the movement of the procession below a predetermined rate.

2. The method of heating steel bodies which comprises subjecting a procession of such bodies to a flowing stream of heated gases, and shortening the time of exposure of the procession to the flowing stream by deflecting the flowing stream away from the procession upon the retarding of the movement of the procession below a predetermined rate while maintaining the temperature of the gases substantially constant.

3. The method of operating a billet or like heating furnace which comprises maintaining a substantially uniform heating condition in a portion of the furnace chamber adjacent the discharging end thereof, and variably heating the remaining part of the furnace chamber according to the rate of movement of billets or other objects therethrough.

4. The method of controlling the temperature of metal bodies moving in succession through an elongated combustion chamber, which comprises burning fuel in the combustion chamber at a substantially uniform rate and withdrawing hot products of combustion from the intermediate zone of the chamber in variable amounts determined by the temperature of those articles which have progressed a predetermined distance less than the full distance through the chamber.

5. In the heating of steel in a furnace, a method of preventing decarburization of the steel which comprises passing the steel through a heating zone in the furnace, supplying heat throughout the length of said zone for normal heating and taking off heat from the zone at a point intermediate its ends and in a plane above and away from the steel to limit the supply of heat when the steel attains a temperature definitely below an excessive temperature, that is, a temperature at which decarburization occurs to such an extent as to render the steel unsuitable for the purpose for which it is being heated.

6. In the heating of steel by a flow of hot gases through a heating zone in a furnace, the method of preventing decarburization of the steel which comprises passing the steel through the heating zone, supplying a continuous flow of hot gases throughout the length of the zone during normal heating, and directing the flow of hot gases out of the heating zone at a point intermediate its ends and in a plane of movement above and away from the steel when the steel attains a temperature definitely below an excessive temperature, that is, a temperature at which decarburization occurs to such an extent as to render the steel unsuitable for the purpose for which it is being heated.

7. In the heating of steel in a continuous furnace by the counterflow of hot gases in a heating zone in the furnace, the method of preventing decarburization of the steel which comprises passing the steel through the heating zone, supplying a counterflow of hot gases throughout the length of the heating zone during normal heating, and by-passing at least a portion of the hot gases out of the heating zone in a plane of movement above and away from and out of contact with the steel when the steel attains a temperature definitely below an excessive temperature, that is, a temperature at which decarburization occurs to such an extent as to render the steel unsuitable for the purpose for which it is being heated.

8. In the continuous heating of steel for rolling, the method of preventing decarburization thereof which comprises passing the steel through a heating zone in a furnace, supplying a flow of hot gases throughout the length of the zone during normal heating, bypassing the hot gases out of the heating zone at a point intermediate its ends when the steel attains a temperature definitely below an excessive temperature, that is, a temperature at which decarburization occurs to such an extent as to render the steel unsuitable for the purpose for which it is being heated and thereafter heating the steel to rolling temperature with sufficient rapidity to prevent decarburization.

MATTHEW H. MAWHINNEY.